United States Patent [19]
Garrison

[11] 3,916,608
[45] Nov. 4, 1975

[54] METHOD OF AND APPARATUS FOR COLLECTING GRASS CUTTINGS

[76] Inventor: Leon E. Garrison, 1309 Belaire Drive, Richardson, Tex. 75080

[22] Filed: Mar. 28, 1974

[21] Appl. No.: 455,598

[52] U.S. Cl. .................................... 56/202; 56/202
[51] Int. Cl.² ...................................... A01D 35/24
[58] Field of Search ........................... 56/194–206, 56/320.2

[56] References Cited
UNITED STATES PATENTS

| | | | |
|---|---|---|---|
| 3,129,550 | 4/1964 | Waag | 56/199 |
| 3,133,396 | 5/1964 | Leader | 56/202 |
| 3,143,842 | 8/1964 | Mattson et al. | 56/202 |
| 3,222,853 | 12/1965 | Michael | 56/202 |
| 3,777,461 | 12/1973 | Giraud | 56/202 |
| 3,805,500 | 4/1974 | Sweet | 56/202 |

*Primary Examiner*—J. N. Eskovitz
*Attorney, Agent, or Firm*—Crisman & Moore

[57] ABSTRACT

The mouth of a disposable bag is positioned to intercept a lawn mower discharge airstream issuing from a port on the mower and carrying out grass and the like to collect the grass cuttings directly in the disposable bag. A carriage supports the bag in horizontal positional alignment with the port to afford ingress of the airstream in a first direction at the lower portion of the bag mouth and egress of the airstream from the upper portion of the bag mouth at a decelerated velocity in a second opposite direction after reversal of the airstream at a substantially vertical wall defined by the bottom of the bag. Grass cuttings are deposited in the bag by impingement against the bag wall and contents therein at the point of reversal and through deceleration of the airstream.

1 Claim, 4 Drawing Figures

METHOD OF AND APPARATUS FOR COLLECTING GRASS CUTTINGS

BACKGROUND OF THE INVENTION

1. Field of the Invention

The present invention relates to a method of and apparatus for collecting grass cuttings from rotary lawn mowers of the type having a discharge port and, more particularly, to a method of and apparatus for receiving and collecting grass cuttings from the discharge port directly into disposable bags.

2. Prior Art

Lawn mowers of the type having a rotary cutting blade generally use the blade as a fan to produce a cut grass carrying airstream. The airstream is usually discharged through a port on one side of the lawn mower into a permanent or non-disposable grass collection receptacle or catcher. The walls of the grass catchers are usually constructed, at least in part, of air-pervious material. The discharge airstream exhausts through the air-pervious walls of the catcher depositing therein the cut grass which cannot pass through. When the grass catcher is full, it is usually detached from the lawn mower and emptied, oftentimes into a disposable plastic bag, generally referred to as garden or trash bags.

Most grass catchers, when full, are heavy and inconvenient to attach and detach on lawn mowers. Furthermore, it is generally cumbersome to empty these grass catchers, as often the grass becomes lodged inside and must be pulled out by hand. Moreover, the repeated emptying of the grass catcher is time consuming and often exposes the operator to blowing dirt and grass, adding discomfort to inconvenience for operators who are allergic to grass cuttings and dust and often restricts their use of such grass catchers.

Prior art grass catchers of the type set forth above require walls constructed with air-pervious material of durable construction. This material is costly, thus being both impractical and inconvenient to dispose of after one use, therefore requiring emptying.

Air-pervious, disposable plastic bags have been used in the past for collecting debris carried in a discharge airstream from a mulching or grinding mechanism. Such an apparatus, though portable, is stationary when in use, and is usually transported to one of several convenient areas in a yard, to receive and mulch tree limbs and debris found in the yard which must be fed into the apparatus by hand. In such devices the disposable bag is supported on the ground adjacent to the mulching apparatus with its open end or mouth aligned in relationship to the discharge airstream of the mulching apparatus. The mouth of the disposable bag is larger than the discharge airstream received therein to avoid any restrictive back pressure building up which could tear the thin walls of the bag.

Air-impervious disposable bags have not been used for the direct collection of cut grass from an airstream issuing out of an output port of an ambulating lawn mower. Heretofore, disposable bags have been merely refuse containers for receiving cut grass from non-disposable grass catchers.

It would be desirable and advantageous to avoid the above-enumerated disadvantages of the prior art by providing some way in which to collect grass cuttings discharged from a lawn mower airstream directly in a disposable bag on an ambulating lawn mower.

SUMMARY OF THE INVENTION

It is one object of the present invention to provide a new and improved method of and apparatus for collecting grass cuttings and the like discharged from a lawn mower which eliminates the necessity of having to empty a grass collection receptable.

Another object of the present invention is to provide a new and improved method of and apparatus for the collection of grass cuttings and the like from a lawn mower of the type having a port for discharge of an airstream carrying cut grass directly in a disposable bag of the type readily obtainable in a variety of sizes in markets and hardware stores.

A new and improved apparatus for the collection of grass cuttings from a lawn mower, of the type having a port for discharge of an airstream carrying cut grass and the like to collect the cut grass directly in a disposable bag, in accordance with the principles of the present invention, may include a carriage for supporting the disposable bag, attachment means for attaching the carriage to lawn mower adjacent to the discharge port and means on the carriage for holding the mouth of the bag open sufficiently to intercept the airstream and direct it along a first longitudinal wall at a first average velocity and to afford egress of the airstream along a second opposite wall at a second reduced average velocity.

A new and improved method of collecting grass cuttings and the like discharged in an airstream directed from lawn mower output port may include the steps of intercepting the lawn mower discharge airstream with a portion of the mouth of a bag, reversing the direction of the airstream inside of the bag depositing the grass cuttings by impingement against the bag wall and contents at the point of reversal, decelerating the reversed airstream by increasing the cross-sectional area available for its egress to facilitate gravity separation of the grass cuttings inside the bag and discharging the decelerated airstream through the remaining portion of the bag mouth.

The present invention teaches an improved method of and apparatus for the collection of grass cuttings, which substantially avoids the inconvenience and problems seen in the prior art. The grass catcher carriage supports a disposable bag of selected size, the attachment means is a bracket for attaching the carriage to the lawn mower, and a rectangular bag frame holds the mouth of the disposable bag at least partially open to intercept the lawn mower discharge airstream carrying cut grass.

The carriage is mounted in cantilevered fashion on the lawn mower by the attachment bracket. The bag frame is pivotally mounted on the carriage in a position to intercept the cut grass carried airstream and direct it into the disposable bag. The bag mouth is removably attached to the bag frame and fixedly retained thereon in the attached position during operation.

The path of the ingress airstream is defined by the shape of the bag which is horizontally supported by the carriage and aligned with the output port. This path is in the opposite direction to the path of egress requiring the airstream to reverse its direction of flow near the end or bottom of the bag. At this point, the momentum of the cut grass carried in the airstream carries the bulk of this grass into the bag wall causing it to be separated from the airstream and deposited in the bag. When the airstream changes direction it decelerates to a velocity insufficient to sustain the air transport out of the bag of remaining cut grass over the pull of gravity.

The disposable bag mouth may be detached from the bag frame when the bag is filled with cut grass to the desired capacity. The bag may be removed from the carriage for discarding and a new bag attached. The bag frame may then be pivoted into position to intercept the discharge airstream. The bag supporting apparatus may remain attached to the lawn mower which eliminates the need to remove the entire grass catcher or the need to empty a grass collection receptacle.

DESCRIPTION OF THE DRAWINGS

For a more complete understanding of the foregoing objects and various features of the present invention, and for further objects and advantages thereof, reference may now be had to the following detailed description taken in conjunction with the accompanying drawings in which.

DETAILED DESCRIPTION

Figure 1:
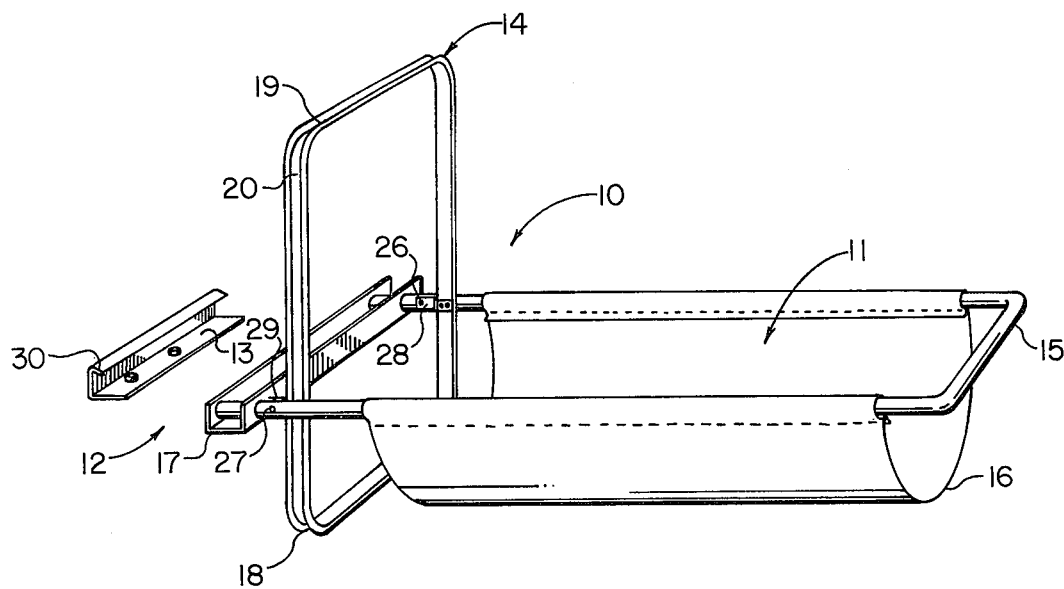
FIG. 1 is a perspective view of the permanent parts of a grass catching apparatus embodying the principles of the present invention.

Referring to FIG. 1, an apparatus 10 includes a carriage 11, an attachment bracket 12 and a bag frame 14. The carriage 11 includes a generally rectangular support frame 15, having a sheet or web of flexible or preformed material 16 spanning the open area between the two opposite sides of the support frame 15, forming a cradle therebetween. The attachment bracket 12 includes a female element 13 adapted to be secured to a lawn mower and for receiving a male element 17, secured to one end of the carriage 11.

As will be understood from the discussion below, the bag frame 14, is adapted to hold the mouth of a disposable bag. This bag may be of the inexpensive trash and garden variety made of thin air-impervious plastic material. The bag frame 14 is rigid and preferably formed from material such as steel or aluminum channel to define a rectangular frame having an external groove 18 formed around its periphery. Although the bag frame 14 is shown with a generally rectangular shape, other shapes could provide the requisite support features. For example, an upper horizontal strut 19 of the bag frame 14 could be removed to create a U-shaped frame. This shape would provide the necessary support to retain a disposable bag mouth in the proper position.

Lying within the groove 18 of the bag frame 14 is an elastic band 20 or other retaining means circumscribing the groove for retaining a peripheral portion of the mouth of a bag placed within the groove. The band 20 fits tightly around the bag frame 14 and provides a simple and easy method of attaching and detaching a disposable bag while securing it during operation.

Figure 2:
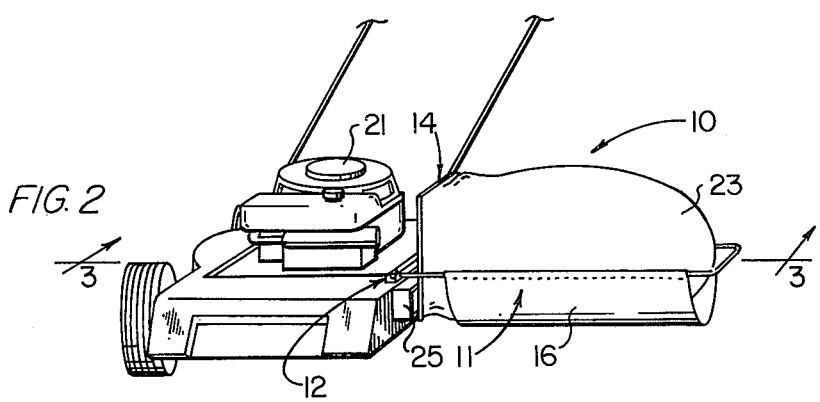
FIG. 2 is a perspective view of the apparatus of FIG. 1, positioned on a lawn mower with a disposable bag attached thereto.
Figures 3, 4:
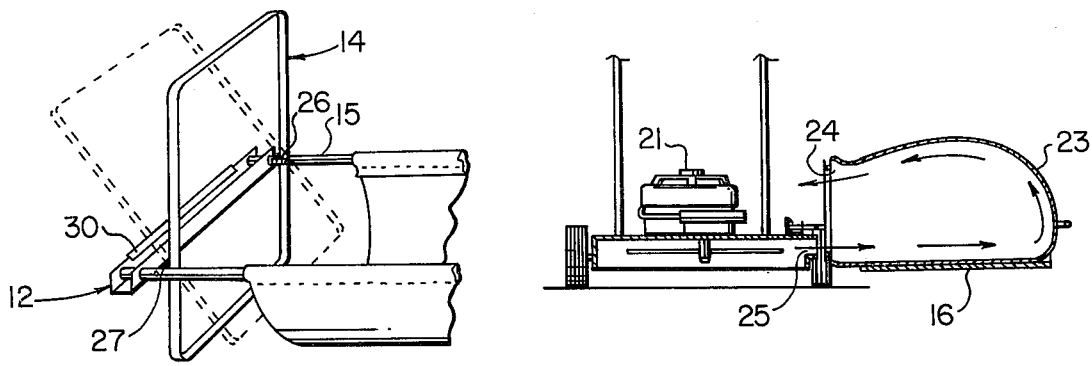
FIG. 3 is a sectional view of the apparatus shown in FIG. 2 taken along the lines 3—3 thereof and showing diagrammatically the lawn mower discharge airstream.
FIG. 4 is an enlarged fragmentary view of the attachment portion of the grass catcher shown in FIG. 1.

As shown in FIGS. 2 and 3, the apparatus 10 is mounted on and cantilevered from a lawn mower 21, with a disposable bag 23 attached. The bag mouth 24 is secured to the bag frame 14 and the remaining portion of bag 23 is supported by the carriage 11 in the cradle defined by web 16. The combination of the apparatus 10 and the bag 23 carried thereby comprises a grass catcher for the lawn mower 21. The apparatus 10 is mounted immediately above and adjacent to the discharge port 25 on the mower 21 and is selectively positioned on the lawn mower 21 by the attachment bracket 12 with the carriage 11 extending from the lawn mower 21 at an angle parallel to the lawn mower discharge airstream. The bag mouth 24 is positioned adjacent to and facing the discharge port 25, preferably at a distance of two to six inches from the port 25, wherein the bag mouth 24 receives the discharge airstream in one of the lower corners thereof. Such alignment provides an airstream ingress path inside the bag 23 defined by the lower sidewall of the bag 23 as positioned by the carriage 11. The bag 23 is shown in the inflated condition in FIGS. 2 and 3, as it would be during operation of the lawn mower.

The grass catcher is supported on the lawn mower 21 out of contact with the ground and is thus capable of performing the function of traditional grass catchers which would be attached to the lawn mower and carried with it for collection of the cut grass directly in a grass catcher while the lawn mower is ambulating.

As shown best in FIG. 3, the discharge airstream indicated by the arrows, enters the lower portion of the mouth 24 of the disposable bag 23 and follows a path along the lower sidewall of the bag 23 substantially parallel to the carriage 11 and defined by the shape of the bag 23 to the end or bottom wall thereof. At this point the momentum of the cut grass carries a substantial amount of the cut grass into the bag wall where the momentum is transferred from the grass to the bag, causing the grass to be deposited therein. When the airstream impinges the bottom wall of the bag 23 the air flow is forced to change direction. The air flow rises along the bottom wall and turns toward the bag mouth thereby taking a path in a direction 180° to the ingress path along an opposite upper sidewall thereof. The velocity of the air decreases along this path due to the increased area of egress, which will be described more fully below.

Referring to FIGS. 1 and 4, the bag frame 14 is pivotally mounted upon the support frame 15 through pins 26 and 27 which extend through a right pivot bracket 28 and a left pivot bracket 29, respectively, attached to the bag frame 14. Each pivot bracket is formed to allow sufficient spacing between the bag frame 14 and the sides of support frame 15 so that the disposable bag 23 may be easily secured at all points around the groove 18 under the elastic band 19. The brackets 28 and 29 allow the bag frame 14 to pivot at least 45° (shown in phantom) from a vertical plane to facilitate the attachment and detachment of the disposable bag 23.

The mounting bracket 12 is shown assembled in FIG. 4. The female element 13 is L-shaped formed with a rolled lip 30. The male element 17 is U-shaped, fixedly attached to, and forming the end element of, support frame 15. The elements 13 and 17 are assembled in interlocking relationship wherein lip 30 supports and retains the cantilevered carriage 11. Mounting bracket elements 13 and 17 are rigid in construction and preferably formed from steel or other suitable material capable of withstanding the cantilevered support forces involved therein without deformation.

The above-described apparatus provides a new and improved method of collecting grass cuttings and the like directly into an air-impervious disposable bag eliminating the step of emptying an air-pervious, non-disposable grass collector into a disposable bag. This is accomplished by the apparatus 10 which aligns the bag 23 in predetermined relationship with the lawn mower discharge airstream. Since the air cannot escape through the impervious bag walls, the mass flow of the air into the disposable bag 23 must equal the mass flow of the air out. All mass flow must pass through the bag mouth 24 and frame 14. Therefore, if the area for ingress were equal to the area for egress, the ingress and egress mass flow velocities would necessarily be equal. By increasing the egress area, the mass flow of exhausting air from the disposable bag is at a reduced velocity. An egressing airstream velocity of one-third or less of the ingressing airstream velocity has proved to be sufficient to facilitate the depositing of cut grass within the disposable bag by impingement and gravity separation. The ratio of egress area to ingress area of three to one or greater will effect this result.

The present embodiment overcomes the prior art deficiencies by enabling the lawn mower operator to attach a disposable bag 23 of selected size to the grass catcher 10 and operate the lawn mower 21 until the disposable bag has been filled to the desired capacity.

It is believed that the operation of the above described invention will be apparent from the foregoing description. While the particular embodiment shown and described is preferred, it will be obvious that various changes and modifications may be made therein without departing from the spirit and scope of the invention, as defined in the following claims.

What is claimed is:

1. A grass catching apparatus for a rotary lawn mower of the type having a port for discharge of an airstream carrying cut grass and the like to facilitate the collection of the cut grass directly in an air impervious disposable bag and providing means for the attachment and detachment of the disposable bag out of line of the discharge airstream of the lawn mower, which comprises:
 a carriage frame of generally rectangular shape for horizontally supporting and providing a means for longitudinal alignment of the disposable bag in parallel relationship to the discharge airstream;
 frame means mounted to said carriage frame and extending uprightly in respect thereto; said frame means positioned at one end of said carriage frame and having a generally rectangular shape, the narrow portion of which being substantially equivalent to the width of said carriage frame and mounted to intersect therewith so that said frame means extends partially downwardly from and substantially upwardly from said carriage frame;
 said frame means further having an external groove formed around its periphery for receiving the mouth of the bag therearound and covering said groove;
 elastic retaining means circumscribing said frame means groove for retaining a peripheral portion of the mouth of the bag within said groove;
 said frame means being pivotally mounted on said carriage frame for rotation about a substantially horizontal axis across said carriage frame, perpendicular to the longitudinal dimension thereof, for providing means for positioning the lower portion of said frame means and bag mouth therearound into and out of registry with said mower discharge port by the pivoting of said frame means and disposable bag mouth;
 a span of flexible material suspended laterally across said carriage frame forming a generally U-shaped cradle extending downwardly from said carriage frame and forming a peripheral end shape adjacent said frame means, substantially equivalent to, and contiguous with, the portion thereof downwardly extending from said carriage frame; and
 means for releasably attaching said carriage frame to the mower for being cantiliverly supported therefrom, with the lower most portion of said frame means and mouth of the disposable bag therearound aligned to intersect the discharge airstream adjacent to the discharge port;
 said flexible cradle positioned on said carriage frame for conforming underlying support of the disposable bag for allowing it to inflate while defining a conforming path of ingress for the mower airstream along the lower conformingly supported wall of the bag providing a smooth ingress flow path in a direction opposite to a path of egress for the airstream along the opposite freely inflated bag wall producing an impingement of the cuttings of the cut grass against the bottom wall of the bag, substantially depositing the cut grass therein.

* * * * *